Dec. 13, 1966    G. E. OPEL    3,290,797
PLANNING AND SCHEDULING BOARD
Filed Nov. 20, 1964    2 Sheets-Sheet 1
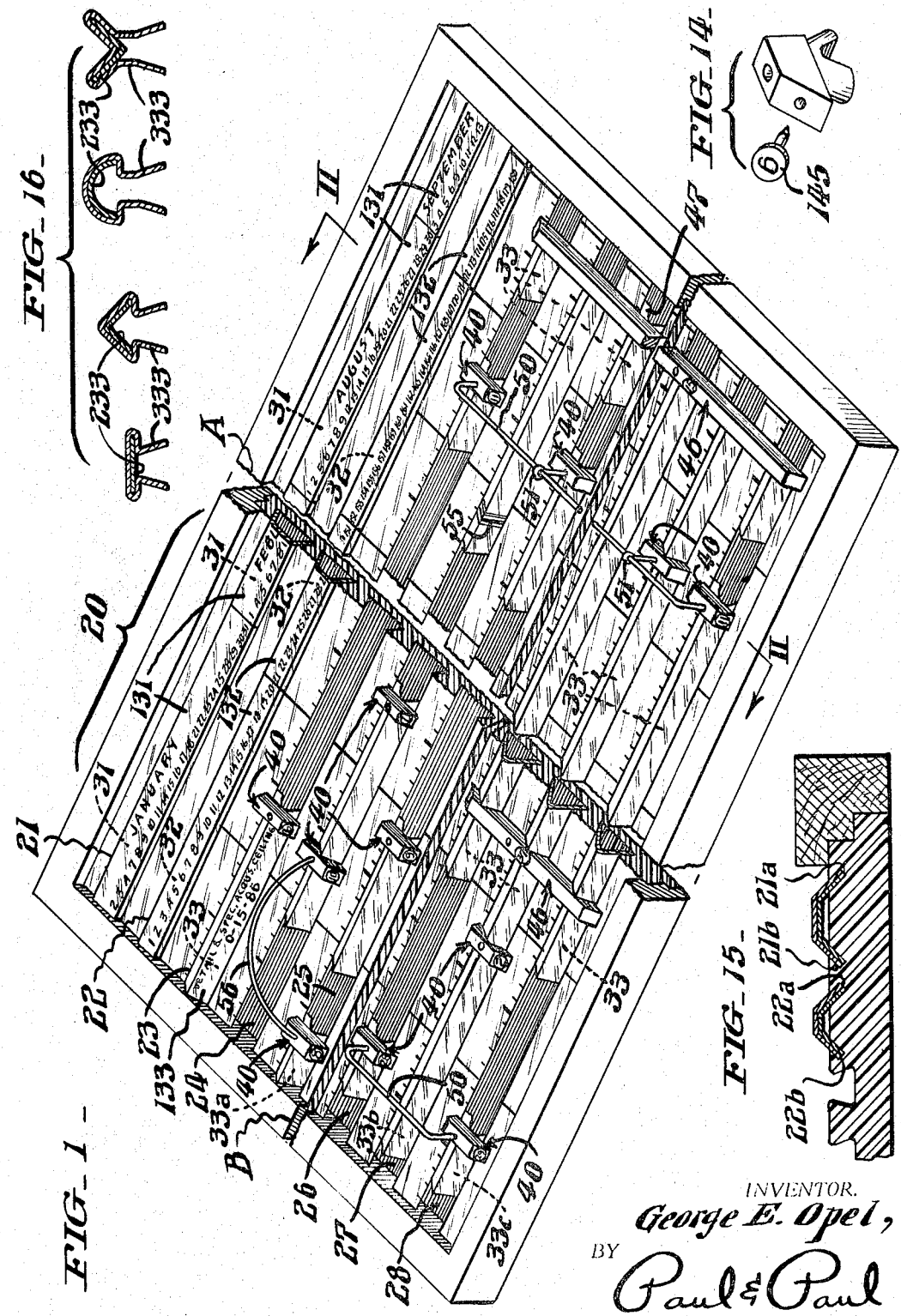
INVENTOR.
*George E. Opel*,
BY
*Paul & Paul*
ATTORNEYS

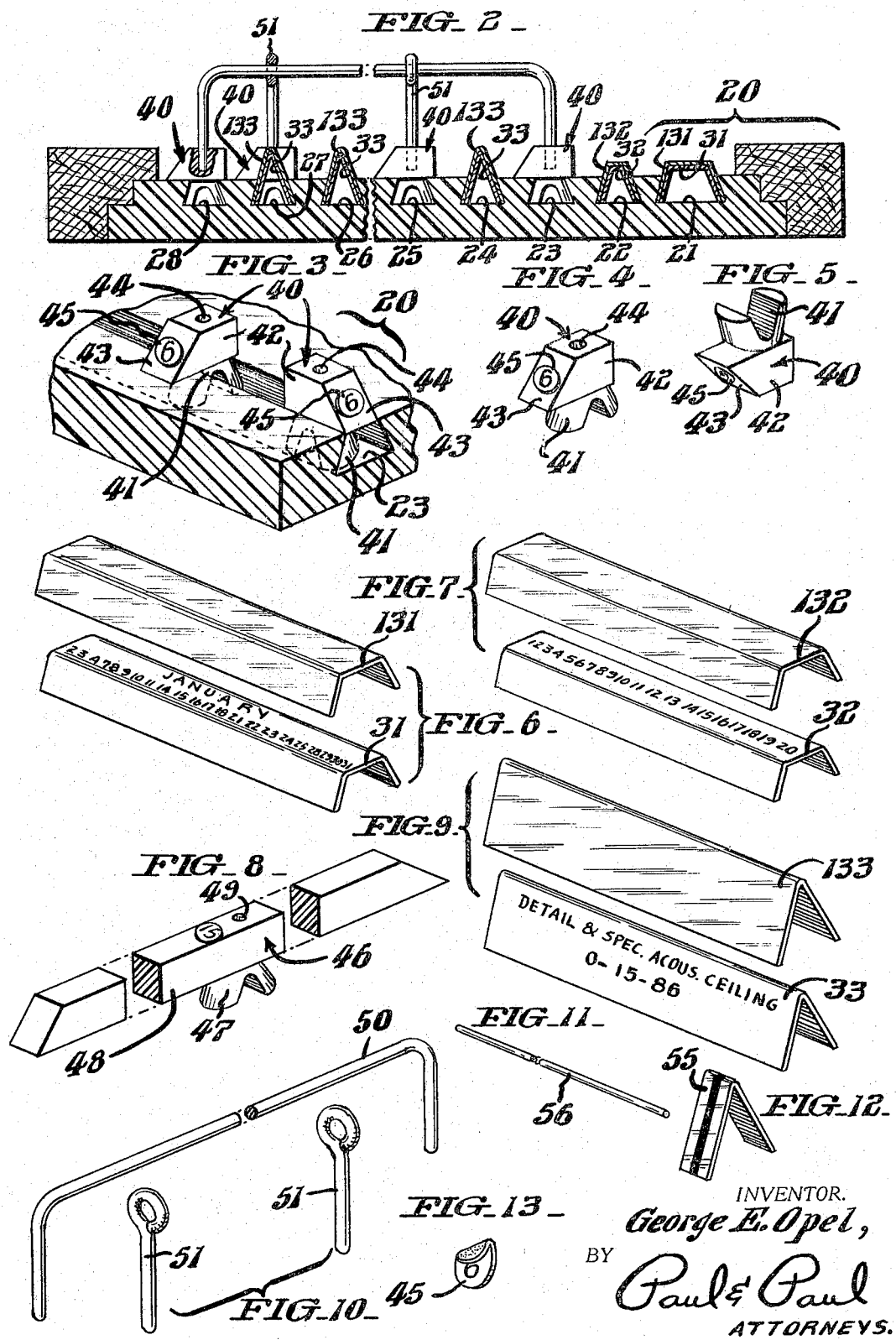

United States Patent Office 3,290,797
Patented Dec. 13, 1966

3,290,797
PLANNING AND SCHEDULING BOARD
George E. Opel, 4031 Kottler Drive,
Lafayette Hill, Pa.
Filed Nov. 20, 1964, Ser. No. 412,765
2 Claims. (Cl. 35—24)

This invention relates to planning and scheduling boards.

In connection with manufacturing, engineering design planning, building operations, etc., particularly large scale work, such as the construction of commercial and industrial plants, office buildings, hotels, military installations, ships, various space projects, etc., it is important to have knowledge and control of planning and work schedules, particularly of starting and completion dates for the numerous activities which are involved, and of the current status of progress thereon. Methods have been devised, such as CPM (the Critical Path Method), or PERT (Program Evaluation and Review Technique) which have been of considerable help in planning and scheduling work but these two prior art methods employ printed or written network diagrams, and thus they are not adaptable to ready revisions, and frequently are not understood by the men on the job responsible for its completion.

I am aware of one prior art proposal to display the information in a more flexible, graphical manner. Such a method has been described in U.S. Patent 3,124,885, granted March 17, 1964, to Stanley Mendell, entitled Graphical Chart Display, but the system described herein represents a substantial improvement thereover.

The object of the present invention is to provide improved means for presenting in a visual and graphic manner the inter-relation between activities, activity starting dates, activity time intervals, activity completion dates, etc., of a complex construction project, while nevertheless having the means adapted to easy revision.

This objective is accomplished by means of a planning and scheduling board which presents a visual display of all the events and activities, in proper sequence, required to perform a given construction project, or to manufacture and produce a given product, or to reach any given goal. The new board is superior to the line layout as used in all CPM (Circuit Path Method), PERT (Program Evaluation and Review Technique) and other similar scheduling programs, in that it visually displays on a time scale all the events and operations required, together with their relation to each other, and "float" time. Since in all projects the scheduling must constantly be reviewed and revised, the new board provides a quick and economical means of keeping the schedule on a current basis.

The new board will first be generally described, and later described in detail. Each activity is represented by a transparent colored plastic V-shaped holder that is cut to a proper length corresponding on the time scale of the board to one day or one time unit less than the scheduled time duration of the event. Each holder contains a V-shaped card on which is written descriptive information regarding the particular job. The V-holders are of resilient plastic material and are designed to lock by friction into a wedge-shaped or other shape of groove or track. To insert the V-shaped holder into the track, the base is sequeezed together. After insertion, the holder spreads and forms a frictional engagement with the track. The V-holder can easily be relocated by either sliding it along the track, or can be removed by squeezing it together and then snapping it into a new location or into a new track.

The plastic V-shaped holders would be provided as components of a kit, and would be supplied in relatively long lengths so that the plastic holder may be cut to a proper length corresponding to the scheduled number of days or other time units required for the activity on the time scale of the board.

The use of multi-color plastics for the V-shaped holders permits the observer at a quick glance to identify all of the major activities or components required for the entire operation. In construction work, for example, different colors can be used for the structural steel, concrete, electrical, heating, ventilating, air-conditioning, etc.

The board itself is adapted for mounting in either the horizontal or vertcal position, or at any angle between horizontal and vertical. The board has no size limitation. By making the board of translucent plastic or glass, it can be illuminated from the rear.

The board may preferably consist of hard extrudable plastic, and may comprise a number of sections joined together. The surface of the board is provided with a series of parallel wedge-shaped or other shaped grooves or tracks so shaped that the previously mentioned V-shaped plastic holders will be held therein by friction. The physical size of the board and the number of tracks, etc. is tailored to the particular project, or to the particular user requirement.

The improved means provided by the present invention will now be described in detail with the assistance of the drawings.

FIG. 1 is a perspective illustration, broken both lengthwise and crosswise, of one form of planning and scheduling board embodying the present invention;

FIG. 2 is an end elevational view, in section, as seen along the line II—II of FIG. 1 looking in the direction of the arrows;

FIGS. 3, 4 and 5 are illustrations of an event block, one of the components used in the board of the present invention;

FIG. 6 is a perspective view of a portion of the calendar working days strip and of its transparent plastic cover;

FIG. 7 is a perspective view of a portion of the actual working days strip and of its transparent plastic cover;

FIG. 8 is a perspective illustration, broken of an event bar;

FIG. 9 is a perspective illustration of a V-shaped work designation card and V-holder;

FIG. 10 is a perspective illustration, broken of the components of an event bridge;

FIG. 11 is a perspective view, broken, of an activity relation jumper;

FIG. 12 is a perspective view of an activity status marker;

FIG. 13 is a perspective view of one form of event number tab;

FIG. 14 illustrates a different form of event number tab;

FIG. 15 is a view in cross-section of the upper portion of the board showing a slightly modified form of calendar and working day tracks; and FIG. 16 illustrates other forms and shapes which the activity designation cards and holders may have.

Referring now to FIG. 1, the reference numeral 20 depicts the planning and scheduling board. The board 20 is preferably of rectangular shape and of such length and width as may be necessary to accommodate the particular project being planned and scheduled. In FIG. 1, the board 20 is broken both lengthwise and widthwise, as at A and B, to indicate that its full length and width are not illustrated.

Board 20 may preferably be formed of a plurality of extruded pieces of hard plastic, such as Plexiglas, dovetailed or otherwise secured together along longitudinal edges. For example, board 20 may consist of a top section, a bottom section, and a plurality of intermediate sections. The number of intermediate sections will vary, depending upon the size and complexity of the project being planned and scheduled. A frame may surround the board, and the frame may be provided with suitable devices for mounting the board on a wall.

The top portion of the board 20 contains lengthwise grooves forming tracks 21 and 22. If desired, tracks 21 and 22 may be formed by four relatively shallow angularly disposed slits 21a, 21b, and 22a, 22b, as illustrated in FIG. 15. Into track 21 are inserted a sequential series of resilient inserts 31 showing the calendar working days or time units for the entire period of the project. Into the other track 22 are inserted a sequential series of resilient inserts 32 showing the actual working days or time units for the entire project. In the particular board illustrated (FIG. 1), the project is scheduled to start on January 2, and is scheduled for completion on September 11, the 179th working day.

The intermediate and bottom portions of the board also contain lengthwise, parallel, wedge-shaped or other shaped grooves or tracks, such as tracks 23, 24, 25, 26, 27, and 28 of FIGS. 1 and 2. In these tracks are inserted the resilient, plastic, preferably V-shaped, activity-designation holders, one for each different activity of the project. One such activity-designation holder is illustrated in FIG. 9 as holder 133. Each activity-designation holder 133 contains a V-card 33 containing activity information. The V-holders and V-cards are cut to an exact length equal to one day or one time unit less than the number of actual working days or time units required for the particular activity, as measured along the actual working days or time units insert 32. For example in the illustration of FIGS. 9 and 1, the activity of preparing the details and specifications for the acoustical ceiling are scheduled to require a total of fourteen working days, beginning on the first working day (January 2) and finishing on the fourteenth working day (January 21). The activity-designation V-card 33 and V-holder 133 for this particular activity are therefore cut to a length equal to 13 days as measured along the insert 32.

While V-shaped cards 33 and V-holders 133 are illustrated in FIG. 9, the activity-designation cards and holders may take other shapes, four of which are illustrated in FIG. 16, by the cards 233 and the holders 333.

The last day of each activity is identified by a hard plastic event block which may preferably take the form of block 40 ilustrated in FIGS. 3, 4 and 5, or bar 46 of FIG. 8. Thus, in the case of the 13-day activity-designation card 33 illustrated in FIG. 9 (and also shown in FIG. 1), the 14th working day is taken up by the event block 40.

Referring now to FIGS. 3, 4 and 5, as well as to FIGS. 1 and 2, the event block 40 may preferably have a wedge-shaped base portion 41 of such dimensions as to be insertable in the track, such as track 23, only when turned sidewise, as illustrated in FIG. 3. After insertion into the track 23 (or other track), the block 40 is twisted 90° and is thereupon held wedged in the track. The upper portion 42 of each event block 40 has a generally rectangular shape having a hole 44 in its upper surface for receiving a plastic bridge rod 50, or an eye pin 51, as will be described. The block has an inclined front face or ramp portion 43 which may have a hole in it to receive a pronged number tab 145 such as illustrated in FIG. 14, or to which a self-sticking event number tab 45, such as is illustrated in FIG. 13, may be secured. Tab 145 or tab 45 may bear a code number to identify the particular activity, where computer analysis is contemplated.

The activity-designation V-cards such as 33 of FIG. 9 are covered by a resilient transparent plastic V-holder 133 of selected color. For example, the V-holders for all of the cement work may be white, the structural steel work gray, the electrical work red, the plumbing work yellow, the air conditioning work brown, etc.

Activity-designation V-cards representing tasks which must be performed first occupy the leftmost positions in the various tracks. In FIG. 1, V-cards 33 and 33a, (in tracks 23 and 25, respectively) occupy the leftmost positions, both of these activities being scheduled to start on the 1st working day of the project. Shortly thereafter, the activity represented by V-card 33b (track 27) is scheduled to start; then activity 33c (track 28); and so on, as indicated by the positions of the V-cards in the various tracks.

The scheduled completion date for each of the activities is represented by the event block at the end of the V-card. For example, the activity represented by V-card 33b is scheduled for completion on January 25 which is the 18th working day of the project. For computer purposes, this activity is coded as event No. 2, as is indicated in FIG. 1 by the number tab on the ramp of the event block.

The example board illustrated in FIG. 1 shows that three activities, occupying space in tracks 26, 27 and 28, and identified as event No. 37 must be completed on, or not later than, the same day, which in the present example is February 5, the 25th working day of the project. These three activites are accordingly terminated in a common event bar of the type illustrated in FIG. 8 and identified by reference numeral 46. Event bar 46 has a base portion 47 similar to that of the event block 40 of FIGS. 3, 4, and 5. The upper portion 48 of event bar 46 extends laterally across the tracks 26, 27 and 28, as seen in FIG. 1. The activities of event No. 37 occupying track 26 and track 28 may be started earlier than scheduled, if desired. This is indicated by the fact that the V-cards and V-holders for these activities may be moved to the left, as viewed in FIG. 1. The activity of event No. 37 occupying track 27 may not, however, be started before the activity of event No. 2 is finished.

In setting up a planning and scheduling board for a complex project, it would sometimes be inconvenient to be required to locate in adjacent tracks the V-cards of activities scheduled for or requiring completion on the same day. Accordingly, the present invention provides event bridges in the form of flexible plastic rods 50 such as illustrated in FIG. 10 for insertion in the holes 44 of the event blocks 40, or in the holes 49 of the event bars 46. The contemplated kit of component parts would include event bridges 50 of different lengths corresponding to the spacings between different tracks of the board. Or the rods could be cut and bent to fit the required span. In FIG. 1, an event bridge 50 is illustrated connecting event blocks in tracks 23 and 28, associated with event No. 11. Other activities of event No. 11 occupy tracks 25 and 27 and these activities are connected to the event bridge 50 of event No. 11 by means of eye pins 51 illustrated in FIGS. 1 and 10. Thus, the board 50, in the example illustrated in FIG. 1, conveys to the observer the information that four activities, identified collectively as event No. 11, are required to be completed on the same day, which in the illustration is August 23, the 167th working day of the project.

The board informs the observer that activities represented by V-cards and V-holders lying to the right of event bridge 50 of event No. 11, and occupying any one of the four tracks 23, 25, 27 or 28, may not be started before event No. 11 is completed, but that activities occupying any one of the other tracks may be started before event No. 11 is finished. For example, the activities of event No. 15 occupying channels 24 and 26 may be started prior to the completion of event No. 11, but the other four activities of event No. 15, occupying tracks 23, 25, 27 and 28 may not.

For the purpose of indicating visually the state of completion of any individual event, activity status markers 55, such as illustrated in FIG. 12, may be placed over the V-holder at a particular day corresponding to the completion stage of the event. One such marker is illustrated in FIG. 1. This marker has a black stripe to indicate to the observer that the activity, for example, event No. 15 in track 24, is completed to the stage of August 14, the 160th working day of the project. In other words, since the event was scheduled to start on August 12, about three days of work is completed.

In summary, it will be seen that with the proposed board, activities which may be performed concurrently occupy different tracks covering concurrent or overlapping working day periods. Where a plurality of activities are scheduled for completion on the same day, the individual event blocks for each activity may be replaced by an event bar 46 (FIG. 8) extending transversely across a plurality of tracks. Such a bar is suitable only where the activities involved occupy adjacent tracks. Where the board is being used to plan and schedule a large and complex project, it will not be feasible to attempt to place in adjacent tracks all those V-cards having the same termination date. It will frequently happen that activities having a common termination date will be separated from each other by intervening tracks. In such cases, the event blocks 40, such as are illustrated in FIGS. 3, 4 and 5, are employed, and are connected by an event bridge rod 50 which connects the two most remote tracks. The intervening event blocks 40 are connected to the bridge by the eye pins 51. Activities which cannot be started before the events of the bridge are completed are placed in tracks occupied by the event blocks which are members of the bridge structure. Activities which may be performed either before or after completion of events of the bridge are represented by V-cards and holders placed in tracks not blocked by the event blocks of the bridged structure.

The activity status markers 55 of FIG. 12 bearing, for example, a black stripe, may be placed over the V-holders at the appropriate working day to indicate that the work is completed to that stage. By such means, a quick glance at the board will indicate which activities are lagging behind and which activities are on schedule.

In some instances, certain relations exist between activities represented by V-cards occupying different tracks although not scheduled for completion on a common date. In such cases, the inter-relationship between activities may be indicated by placing an activity-relation jumper 56 (FIG. 11) between the event blocks. Such an activity relation is indicated in FIG. 1 by jumper 56 placed between the event blocks of event Nos. 8 and 10.

The V-cards 33 (FIG. 9), or other suitable cards for other suitable friction-type lock holders, such as those shown in FIG. 16, may contain, in addition to a written abbreviated description of the activity, code information as desired. For example, the back of the V-card may contain two numbers, such as 105–108. The second of these numbers is the event number of the particular activity represented by the card. The first number is the event number of the activity which precedes event number 108 in that particular track. In setting up the board, the event block is placed first at the date of scheduled completion of the activity, and the V-card and V-holder are then placed in the track in front (to the left) of the event block. Thus, having the two event numbers just described on the back of the V-card enables the card to be replaced in its proper location in case it is accidently dislodged. The face of the V-card may contain three numbers, such as 85–8–93. The middle number indicates the number of working days the activity will require, eight in the present example. The third number represents the latest working day on which the job may be completed, the 93rd working day in the present example. The first of the three numbers indicates the earliest date on which the job may be started, the 85th working day in the present example. In this case no slack or float time is involved since the sum of the first two numbers equals the third.

To set the board up, the following steps may be followed:

Insert, in track 22, a series of consecutive working day strips having a total length equal to the actual number of working days scheduled for the total project.

Insert, in track 21, a series of calendar working day strips, lining up the actual calendar starting date with the first working day in track 22.

Insert an event block directly under the latest scheduled completion date for each activity. Keep events in proper sequence by using different tracks to display non-related activities.

Select appropriate color of plastic V-holder (or other shape holder) to represent the particular event. Cut to a length equal to one day or one unit time less than the estimated time required for the event.

Using the cut plastic V-holder as a guide, type on a V-card (or other suitable card) the necessary information and cut the card to length. Place card in V-holder, or other suitable friction lock holder, and insert in proper track at proper location.

By use of either event bars or event bridges, connect events located in different tracks which must be completed not later than the same day.

After all the pieces for all of the activities of a particular project have been placed in their proper positions on the board, the critical path will be readily apparent. The critical path, will, of course, be that path having no slack or float time over the entire period from the first working day to the scheduled completion date.

It will be desirable to maintain a logbook listing all the activities in sequential order so that those having too short a duration for identification on the board itself can be readily looked up. For example, one event block may be immediately adjacent to another event block in the same track. This indicates the activity between these two events will take only one day and the description in the log will identify it, so the supervisor can plan it properly.

The planning and scheduling board described herein, formed of plastic components, is light in weight, inexpensive and simple to mass produce. It is attractive in appearance, is easy to clean and is completely reusable for project after project.

While the preferred embodiments of this invention have been described in some detail, it will be obvious to one skilled in the art that various modifications may be made without departing from the invention as hereinafter claimed.

Having described my invention, I claim:

1. A planning and scheduling board of hard extrudable plastic having a plurality of parallel groove tracks; a unit time scale indicated along said tracks; a plurality of activity-designation cards and resilient plastic holders for said cards adapted for friction-type lock insertion into said tracks and adapted to be cut to lengths corresponding to one unit time less than the number of working time units scheduled for the particular activity, a plurality of hard plastic event blocks having a width equal to one working time unit and a base portion adapted for friction-type lock insertion into said tracks at the terminal ends of the activity-designation cards and holders; plastic event bars having a width equal to one working time unit and length sufficient to cross a selected number of tracks, said event bars having a base portion adapted for friction-type lock insertion into said tracks; elongated bridge rods adapted to connect event blocks in non-adjacent tracks by bridging over intervening tracks, and coupling means for coupling event blocks in selected intermediate tracks to the bridge rods.

2. A planning and scheduling board of hard extrudable plastic having a plurality of parallel groove tracks; a working unit time scale indicated along said tracks; a plurality of activity-designation V-cards and resilient V-plastic holders for said cards for removable friction-type lock insertion into said tracks and adapted to be cut to lengths corresponding to one working unit time less than the number of working time units scheduled for the particular activity, a plurality of hard plastic event blocks having a width equal to one working time unit and a base portion adapted for removable friction-type lock insertion into said tracks at the terminal ends of the activity-designation cards and holders; plastic event bars having a width equal to one working time unit and length sufficient to cross a selected number of tracks, said event bars having a base portion adapted for removable friction-type lock insertion into said tracks; removable elongated bridge rods for connecting event blocks in non-adjacent tracks by bridging over intervening tracks; and eye-pin coupling means for coupling event blocks in selected intermediate tracks to the bridge rods.

References Cited by the Examiner

UNITED STATES PATENTS 3,124,885   3/1964   Mendell _____ 35—24.2
3,162,174  12/1964   Whyte _____ 35—24.2 X JEROME SCHNALL, *Primary Examiner.*

EUGENE R. CAPOZIO, *Examiner.*

W. GRIEB, *Assistant Examiner.*